Jan. 27, 1970  D. W. BURR  3,491,627
MACHINE TOOL CONTROL
Filed Oct. 25, 1967  2 Sheets-Sheet 1

Donald William Burr
Inventor

Jan. 27, 1970   D. W. BURR   3,491,627
MACHINE TOOL CONTROL
Filed Oct. 25, 1967   2 Sheets-Sheet 2

Donald William Burr
*Inventor*

United States Patent Office 3,491,627
Patented Jan. 27, 1970

3,491,627
MACHINE TOOL CONTROL
Donald William Burr, Malvern, England, assignor to Minister of Technology in Her Britannic Majesty's Government of the United Kingdom of Great Britain and Northern Ireland, London, England
Filed Oct. 25, 1967, Ser. No. 678,044
Claims priority, application Great Britain, Oct. 27, 1966, 48,183/66
Int. Cl. B23b 21/00
U.S. Cl. 82—24                 5 Claims

ABSTRACT OF THE DISCLOSURE

A machine tool which has a non-contacting marker following a profile of the workpiece. The position of the marker is compared with the required position and an error signal is generated which is used to control the position of the marker. The tool for performing the machining operation is controlled to follow the marker.

---

Figure 1:
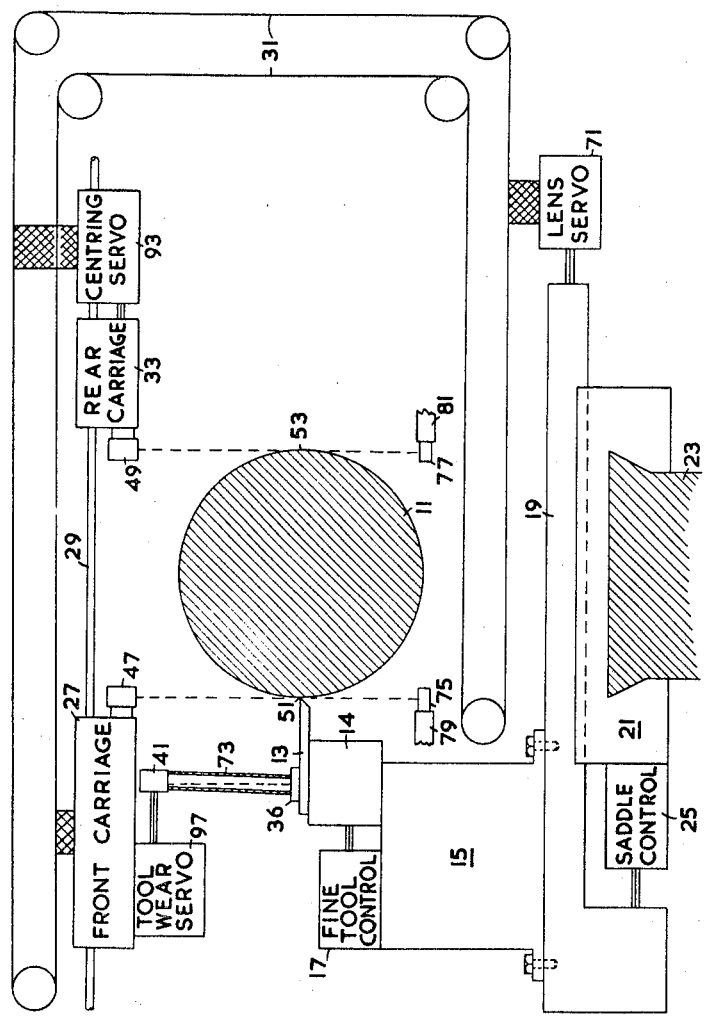

The present invention relates to machine tools.

Several systems for the numerical control of machine tools have appeared in recent years: very rarely, if ever, have they incorporated true closed-loop control, i.e. control by servo loops which include the monitored shape of the workpiece.

The essential feature of closed-loop control as applied to machining is the continuous and automatic control of the cutting tool by servos driven from error signals derived from a continuous comparison of the required shape with the shape already cut. The system is fundamentally different from numerical control and other operator aids which rely either on the intermittent attention of a skilled operator or on the mechanical rigidity of the machine tool for their ultimate accuracy. These disadvantages can only be regarded as serious fundamental ones.

United Kingdom patent application No. 5,290/65, however, provides a true closed-loop machine tool control system in which the relative position of the workpiece and a cutting tool is continuously monitored and the information obtained is used to correct the position of the cutting tool by a control mechanism of adequately fast response. The present invention is a development from that invention.

According to the present invention there is provided a machine tool for the machining of a workpiece including a tool for performing an operation on the workpiece, a first marker means out of contact with the workpiece for following a first profile of the workpiece at the rear of the tool, means for measuring the position of the first marker means, means for comparing the measured position of the first marker means with the required position of the first marker means, means, responsive to the means for comparing, for controlling the position of the first marker means and means for controlling the tool to follow the position of the first marker means.

By "machining" is meant any of the processes carried out by machine tools, such as cutting, drilling, grinding, milling, planing, shaping, slotting, etc.

The marking means may be a carriage mechanically connected to the means for holding the tool and its position may be controlled with reference to a fiducial point or line on the machine. The marking means may alternatively or additionally work in conjunction with a further marking means connected to the means for holding the tool for parallel motion in the opposite direction.

(For example, in a lathe a front carriage may be connected to move parallel to and in the same direction as the lathe cross-slide and a rear carriage may be connected to move parallel to them both but in the opposite direction. The distance between fiducial marks on the front and rear carriages may be measured and compared with the required distance; an error signal may be used to adjust the distance, and the tool may be controlled to follow the front carriage.)

A further servo loop may provide for the correction of centring errors. The force of the tool on the workpiece is bound to distort the machine tool to some degree (however slight) and even to distort the workpiece itself; the errors introduced by these distortions can be overcome by measuring the actual dimensions of the workpiece during machining.

A further servo loop may provide for the correction of tool wear errors. As the tool wears the distance between its working edge and its fiducial point or the part by which it is controlled will lessen and a given position of the tool will no longer imply the same position of the working surface of the workpiece. The error introduced by this wear can be overcome by measuring the actual dimensions of the workpiece during machining.

Figure 2:
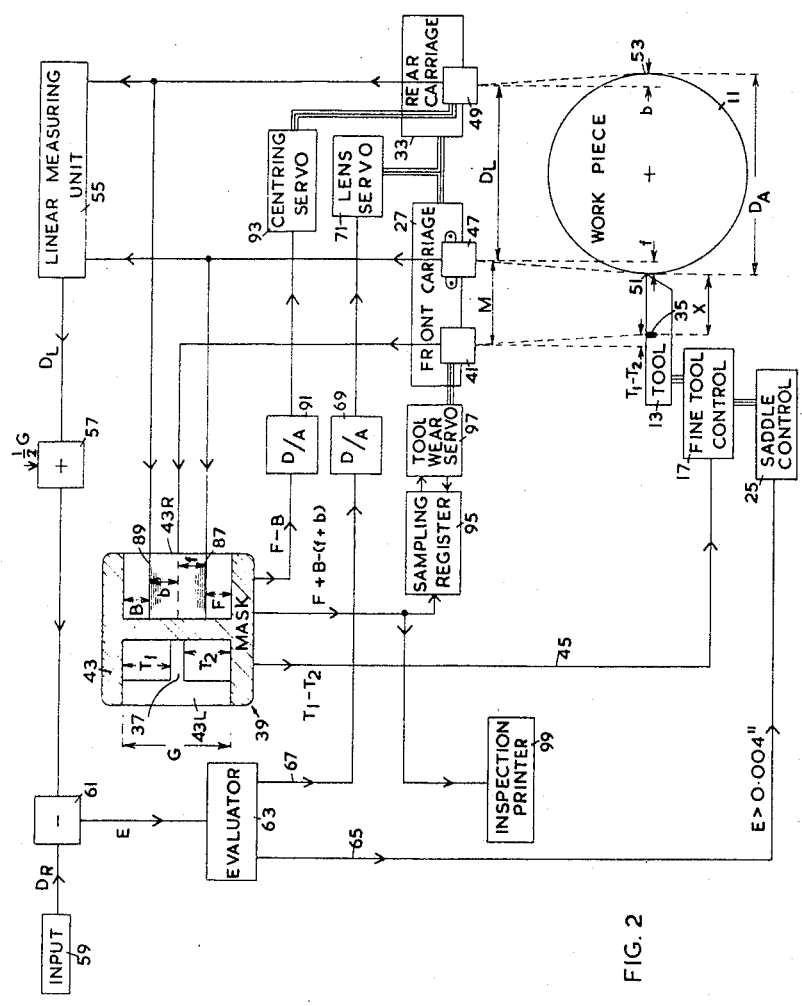

An embodiment of the invention will be described by way of example with reference to the accompanying drawings, in which:

FIGURE 1 is a partial cross-sectional diagram in outline of a lathe embodying the invention, and FIGURE 2 is a diagram illustrating the logic of the control system.

In order to apply true closed loop control to a lathe (or similar machine) it is desirable to measure the radius of the workpiece at a point on the surface under the cutting tool. Closed loop control of successive radii ideally involves continuous measurement of the distance between a point in the axis of rotation (which may well be moving) and a point on the surface coincident with the tip of the cutting tool. Neither of these points is accessible to the optical calipering type of measurement used in the embodiment. Nevertheless it is possible to deduce this distance by making two measurements nearby, one of the distance between the tool and the machine centre and one of the diameter of the workpiece behind the tool.

It is convenient to have two modes of operation. The first mode is a roughing and approach mode in which only the first measurement is made because of the amount of metal removed. The second mode is a precision mode in which precision optics are used to make the second measurement concurrently with the first. The workpiece is typically machined twice, therefore, with the lathe changing its mode of operation between the two cuts. The first cut is a metal removing cut with the lathe working in the roughing and approach mode. The second cut is a finishing cut with the lathe working in the precision mode.

In the roughing and approach mode the cutting tool is controlled only from a mark on the tool or a marker attached to the tool. The measurement of workpiece diameter and length at a point under the cutting tool as derived from the position of the tool marker actuates a very fast main control on cutting tool position and eliminates most of the errors due to inaccuracies or yield of the basic machine. In the precision mode optical components measure the actual diameter of the workpiece about ¼ inch behind the cutting tool. Although this involves a time delay which would be unacceptable for the main loop the measurement is quite acceptable either for providing a printed inspection record of the finished machine work or for compensating the main control loop for any errors due to initial setting of the tool or subsequent tool wear.

The use of two different modes of operation has a further advantage. A practical machine tool must be robust and immune to swarf and coolant. This is achieved in the roughing and approach mode by retracting those precision optics that are below the workpiece and used only in the precision mode. The light path by means of which the position of the tool marker is measured is totally enclosed as is described below. When the machine changes its mode of operation to the precision mode, the precision optics below the workpiece are extended automatically, throwing clear any accumulated swarf. During operation in the precision mode the swarf problem is less severe and optical components are kept clear of coolant and the light swarf generated during machining by small jets of compressed air.

ROUGHING AND APPROACH MODE

FIGURE 1 is a partial cross-sectional diagram of a lathe in which a workpiece 11 is being cut by a cutting tool 13. The tool 13 is supported on a tool post 14 which is slidable on a block 15 under the control of a fine tool control servo 17. The block is mounted on a cross slide 19 on a lathe saddle 21 which is supported on the lathe bed 23. The position of the cross slide 19 on the saddle 21 is controlled by a saddle control servo 25.

A front carriage 27 is arranged to slide parallel to the cross slide 19 on means 29 carried by the saddle 21. The means 29 may be, for example, precision ground rods. A conventional mechanism such as a roller and steel tape system 31 arranges that the front carriage is constrained to move in the same direction as the cross slide 19. A rear carriage 33 is also arranged to slide on the means 29 and is constrained by the mechanism such as 31 to move in the opposite direction to the front carriage 27 and the cross slide 19.

It is convenient at this place to describe the logic of the control system which is illustrated in FIGURE 2. Components of FIGURE 2 which are identical with components of FIGURE 1 bear the same reference numerals.

The cutting tool 13 carries a marker 35 an image 37 of which is thrown on the photocathode 39 of a television camera via a lens 41 and a conventional optical system. The photocathode 39 carries an I-shaped mask 43 defining two rectangular openings, a right-hand opening 43R and a left-hand opening 43L. The image 37 is thrown on the left-hand opening 43L of the mask 43 and the position of the tool 13 relative to the front carriage 27 is represented by the vertical position of the image 37 in the opening 43L. In fact the distance of the marker 35 off the optical axis of the lens 41 is proportional to $T_1-T_2$, where $T_1$ is the distance between the top edge of the top edge of the opening 43L and the top edge of the image 37 and $T_2$ is the distance between the bottom edge of the opening 43L and the bottom edge of the image 37.

The photocathode 39 is scanned across the I of the mask 43, that is to say in a direction perpendicular to the motion of the image 37 under relative motion between the tool 13 and the front carriage 37. The distances $T_1$ and $T_2$ are therefore measured exactly by counting lines between the edges concerned; these counts are extracted from the photocathode waveform in a conventional manner.

The distance $T_1-T_2$ being a measure of the distance of the marker 35 off the optical axis of the lens 41, it is fed to the fine tool control servo 17 via a channel 45 to control the tool 13 to keep the marker 35 on the optical axis of the lens 41.

The front carriage 27 carries a further lens 47 and the rear carriage 33 carries a lens 49. The function of the lens 47 is to follow the required profile of the front edge 51 of the workpiece 11 and the function of the lens 49 is to follow the required profile of the back edge 53 of the workpiece 11; however they are not used as lenses in the roughing and approach mode, but merely as markers the distance between which is measured in a linear measuring unit 55. A suitable unit is described in the specification of United Kingdom patent application No. 48,567/65.

The output of the linear measuring unit 55 is a signal representing $D_L$, the distance between the optical axis of the lens 47 and the optical axis of the lens 49. The lens 47 is set so that its optical axis is normally inset from the front edge 51 of the workpiece 11 by a small distance $\frac{1}{4}G$ and the lens 49 is set so that its optical axis is normally inset from the back edge 53 of the workpiece 11 by the same small distance $\frac{1}{4}G$. The best estimate of the actual diameter $D_A$ of the workpiece 11 therefore is given by $D_L+\frac{1}{2}G$. The value $\frac{1}{2}G$ is therefore added to $D_L$ in an adder 57.

The requirement, that is the diameter which the workpiece 11 is to be machined to, is made available from an input 59 in the form of a quantity $D_R$, the required diameter of the workpiece. The quantity $D_R$ is subtracted from the estimated true diameter $D_L+\frac{1}{2}G$ in a substractor 61 and the difference E applied to an evaluator 63.

The function of the evaluator 63 is to assess the magnitude of the difference E: if the difference E exceeds 0.004 inch then a signal is applied to the saddle control servo 25 via a channel 65; if the difference E does not exceed 0.004 inch, however, a signal is applied on a different channel 67. The channel 67 is connected to a digital to analogue converter 69 whose output is connected to a lens servo 71.

The lens servo 71 is arranged to adjust the relative position of the front carriage 27 and the rear carriage 33. This it will do until the error signal from the main subtractor 61 is zero.

The action of the lathe in the roughing and approach mode is as follows. The requirement, specified as a diameter $D_R$, is applied to the main subtractor 61 from the input 59. Meanwhile the distance $D_L$ between the optical axis of the lens 47 and that of the lens 49 is measured by the linear measuring unit 55, added to the value $\frac{1}{2}G$ in the adder 57. The subtractor 61 computes the difference E between this quantity $D_L+\frac{1}{2}G$ and the required value $D_R$ and the evaluator 63 sends a signal on the channel 65 (provided E exceeds 0.004 inch), causing the saddle servo control servo to move the cross slide 19. This moves the front and rear carriage 27 and 33 and the new value of $D_L$ is measured by the linear measuring unit 55 and transmitted to the main subtractor 61 via the adder 57. This process continues until E no longer exceeds 0.004 inch.

When E is 0.004 inch or less the evaluator 63 sends a signal on the channel 67 which causes the lens servo 71 to adjust the positions of the front and rear carriages 27 and 33 until the value of $D_L$ as measured by the linear measuring unit 55 is such that $$D_L+\frac{1}{2}G=D_R$$

Meanwhile the marker 35 on the tool 13 will be kept on the optical axis of the lens 41 by the optical system, the television camera 39 and the control signal sent down the channel 45 to the fine tool control servo 17.

When a sudden change occurs in the diameter called for by the input 59, for example, when a step is being cut into the workpiece 11, a sudden change in the value of E will result. This will rapidly control the saddle control servo 25, and the control loops will again act as described above.

PRECISION MODE

In the precision mode two other light paths are established. The swarf generated in the precision mode is only light and is unlikely to interfere with the optical systems.

The front edge 51 and the back edge 53 of the workpiece 11 are illuminated by means described in more detail below. An image 87 of the front edge 51 of the workpiece 11 is thrown on the photocathode 39 in the lower half of the opening 43R of the mask 43. Similarly an image 89 of the back edge 53 of the workpiece 11 is thrown on the photocathode 39 in the upper half of the opening 45R of the mask 43. The optical axes of the lenses 47 and 49 are arranged to cross the same horizontal diameter of the workpiece 11, about $\frac{1}{4}$ inch behind the tool 13, i.e. adjacent to part of the workpiece 11 that has already had its finishing cut.

The optical axis of the lens 47 is inset from the front edge 51 of the workpiece 11, as mentioned above, by a distance ¼G, and the optical axis of the lens 49 is similarly inset from the back edge 53 of the workpiece 11 by a distance ¼G.

When the control system is properly adjusted, the images 87 and 89 of the front and back edges 51 and 53 respectively of the workpiece 11 will be such that the area of light and the area of dark in the image 87 will be equal, as will the area of light and the area of dark in the image 89. The difference in area between the light portion of the image 87 and the light portion of the image 89 in the opening 43R of the mask 43 is applied electronically as a control signal to a digital to analogue converter 91, whose output is applied to a centring servo 93. The output of the centring servo 93 is applied to the lens 49 in order to adjust it relative to the rear carriage 33.

The total difference in area between the light portion of the images 87 and 89 in the opening 43R of the mask 43 and the dark portions thereof is applied as an electronic signal to a sampling register 95 connected to a tool wear servo 97 which is arranged to adjust the position of the lens 41 relative to the front carriage 27. This difference is also supplied to an inspection printer 99.

The action of the machine tool in the precision mode is as follows. The workpiece having already been machined to a fairly high accuracy in the roughing and approach mode, there remain three problems. The first problem is to put a fine finishing cut on the workpiece, and the other two are to overcome centring and tool wear errors.

The first problem is dealt with by choice of tool and feed rate and is no part of the present invention.

Centring errors will in general arise in any machine tool. In conventional high accuracy machine tools they are small enough to be within the tolerances on the finished workpiece but it is desirable to measure them and compensate for them while machining. The errors may arise through inaccuracies in the basic machine, lack of rigidity in the basic machine, lack of rigidity in the workpiece, thermal distortions or other causes but may be compensated for if the position of the front carriage 27 and the position of the rear carriage 33 are both adjusted until the optical axes of the lenses 47 and 49 are equidistant from the centre of rotation of the workpiece.

Therefore the width B of the white area of the image 89 is compared with the width F of the white area of the image 87 by automatically counting lines on the photocathode 39 by extracting the counts from the photocathode waveform in a conventional manner. The difference $F-B$ is supplied to the centring servo 93 via the driving amplifier 91. The centring servo 93 will adjust the position of the lens 49 until the optical axes of the lenses 47 and 49 are equidistant from the centre of rotation of the workpiece 11. Although at first sight this appears likely to upset measurements on the workpiece 11, nevertheless since the measurements are made on the lenses 47 and 49 by the length measuring unit 55, the true diameter of the workpiece 11 is constantly being monitored. If adjustment of the position of the lenses 49 relative to the rear carriage 33 introduces a discrepancy between the measured diameter of the workpiece 11 and the input requirement $D_R$ then the output 67 from the filter 63 will be applied to the lens servo 71 to adjust the relative position of the front and rear carriages 27 and 33, so maintaining things as they should be.

The second error that requires compensating for is the effect of wear on the cutting tool 13 or possible inaccurate positioning of the marker 35 relative to the cutting edge of the cutting tool 13. In the presence of wear the distance X between the marker 35 and the cutting edge of the cutting tool 13 will decrease and the workpiece 11 will be machined slightly oversize. Therefore the images 87 and 89 will no longer be half workpiece and half space, but more workpiece than space. A control signal proportional to the difference in area between space and workpiece of the images in the right hand opening of the I of the mask 43 is generated by conventional means. This area is proportional to $F+B-(f+b)$, where $f$ is the width of the dark area of the image 87 and $b$ is the width of the dark area of the image 89.

The control signal is subject to considerable transport delay because of the distance along the workpiece 11 between the tool 13 and the inspected diameter, that is the diameter where the optical axes of the lenses 47 and 49 cross the plane containing the tool and the centre of rotation. Any correction of tool wear error applied to the tool 13 will not have an effect on the inspected diameter until machining has progressed along the workpiece by the ¼ inch or so that separates the tool 13 from the inspected diameter.

Therefore the value of the control signal at a given instant is stored in the sampling register 95 and the tool wear servo 97 is controlled by the contents of the sampling register 95. As the tool wear servo 97 moves it sends a signal back to the sampling register 95, emptying it of its stored signal. When the tool wear servo 97 has moved by the required amount the sampling register 95 will be empty. The control signal proportional to $F+B-(f+b)$ may be sampled again at any convenient instant later. In fact it is sampled at instants which are not closer in time than the time that it takes for the newly machined part of the workpiece 11 to be inspected by the lenses 47 and 49 and their associated optical systems.

This type of control is allowable here because the control signal proportional to $F+B-(f+b)$ is a very slow moving error signal, which is unidirectional, since X will never increase.

The value of the control signal proportional to $F+B-(f+b)$ gives the absolute value of the errors in the true diameter of the workpiece 11. It is therefore supplied to the inspection printer 99, which thereupon provides an inspection record of each individual workpiece.

If it is desired it is possible to run finished workpieces through the optical calipers provided by the lathe against a specified requirement. Such an operation can be thought of as an additional mode called the inspection mode.

INSPECTION MODE

In the inspection mode no machining is done on the workpiece, and so there will be no tool such as the tool 13 and the lens 41 will not be used. The front carriage 27 and the rear carriage 33 are moved to follow the edges of the workpiece 11. Therefore the lens servo 71 is controlled by the control signal proportional to $F+B-(f+b)$ via the digital to analogue converter 69. The servo 93 is still used for centring.

The output of the evaluator 63 on the channel 67 will now be a reliable indication of the difference between the requirement $D_R$ and the true diameter $D_A$ of the machined workpiece 11 and can therefore be supplied directly to the inspection printer 99 for providing a printed inspection record.

FIGURE 1 illustrates a possible practical way of carrying out the logic illustrated in FIGURE 2.

During operation in the roughing and approach mode a large amount of heavy swarf may be generated. The only way in which such swarf would interfere with the machine tool in this mode would be by interrupting the light path between the marker 35 and the lens 41. This light path is therefore totally enclosed by a tube 73. The tube 73 may be flexible or it may be straight with flexible ends; it should be such that an image of the tool marker 35 falls on the lens 41.

It is sufficiently accurate for the top of the tool post 14 to be regarded as rigid as the tool 13 and for the marker 35 to be in fact a cross wire on a lamp house 36 rigidly fixed on the tool post 14.

The means by which the front edge 51 and rear edge 53 of the workpiece 13 are illuminated conveniently include lamps 75 and 77 which are retractable into casings 79 and 81 respectively, out of the way of swarf and coolant. When the lamps 75 and 77 are extended, swarf in the way will tend to be pushed out of the way.

Compressed air may cause the lamps 75 and 77 to be extended and the compressed air may serve both as cooling means and means for keeping the lamps 75 and 77 free of swarf.

The lens servo 71 acts on the tape system 31 and so is conveniently placed in the connection between the cross slide 19 and the tape system 31.

I claim:
1. A machine tool for the machining of a workpiece including a tool for performing an operation on said workpiece, a first marker means out of contact with said workpiece for following a first profile of said workpiece at the rear of said tool, means for measuring the position of said first marker means, means for comparing the measured position of said first marker means with the required position of said first marker means, means, responsive to said means for comparing, for controlling the position of said first marker means and means for controlling said tool to follow the position of said first marker means.

2. A machine tool for the machining of a workpiece including a tool for performing an operation on said workpiece, a first marker means out of contact with said workpiece for following a first profile of said workpiece at the rear of said tool, means for measuring the position of said first marker means, means for comparing the measured position of said first marker means with the required position of said first marker means, means responsive to said comparing means for controlling the position of said first marker means, detector means connected to said first marker means, tool measuring means rigidly connected to said tool, means for throwing an image of said tool measuring means on said detector means, and means, controlled by the output of said detector means, for controlling the position of said tool relative to said first measuring means.

3. A machine tool as in claim 2 and further including means for gauging the relative position between said first profile and said first marker means and means, controlled by said means for gauging, for adjusting the relative position between said first marker means and said tool.

4. A machine tool as in claim 2 and further including a second marker means out of contact with said workpiece and means for moving said second marker means in contrary motion to said first marker means, and in which said means for measuring the position of said first marker means is arranged to measure the position of said first marker means relative to the position of said second marker means.

5. A machine tool as in claim 4 and further including a first means for gauging the relative position between said first profile and said first marker means, a second means for gauging the relative position between said second profile and said second marker means, means, controlled by said first means for gauging and said second means for gauging, for adjusting the relative position between said first marker means, and said tool and means, controlled by said first means for gauging and said second means for gauging, for adjusting said spatial relationship between said first marker means and said second marker means as they are controlled to move in contrary motion.

References Cited

UNITED STATES PATENTS

| | | | |
|---|---|---|---|
| 2,485,355 | 10/1949 | Brennan | 82—21 XR |
| 2,831,387 | 4/1958 | Ovshinsky | 82—24 |
| 2,955,155 | 10/1960 | Mayer | 90—13 X |
| 3,217,568 | 11/1965 | De Graffenried | 77—3 |
| 3,269,233 | 8/1966 | Lothmann | 82—14 |

GERALD A. DOST, Primary Examiner